United States Patent [19]

Adamski

[11] Patent Number: 4,559,217
[45] Date of Patent: Dec. 17, 1985

[54] METHOD FOR VACUUM BAKING INDIUM IN-SITU

[75] Inventor: Joseph A. Adamski, Framingham, Mass.

[73] Assignee: The United States of America as represented by the Secretary of the Air Force, Washington, D.C.

[21] Appl. No.: 547,611

[22] Filed: Nov. 1, 1983

[51] Int. Cl.⁴ .............................................. C01B 25/08
[52] U.S. Cl. ........................................ 423/299; 75/62; 148/175; 148/DIG. 130
[58] Field of Search ...................... 148/175, DIG. 130; 423/299; 75/62

[56] References Cited

U.S. PATENT DOCUMENTS

| | | | |
|---|---|---|---|
| 2,871,100 | 1/1959 | Guire et al. | 423/299 |
| 2,937,075 | 5/1960 | Weiser | 423/299 |
| 3,269,878 | 8/1966 | Wenzel et al. | 148/175 |
| 3,520,810 | 7/1970 | Plaskett et al. | 252/62.3 |
| 3,877,883 | 4/1975 | Berkman et al. | 23/301 SP |
| 4,220,488 | 9/1980 | Duchemin et al. | 148/175 |

OTHER PUBLICATIONS

Yamamoto et al., "InP Single Crystal Growth by the Synthesis Solute Diffusion Method," Japan J. Appl. Phys., vol. 17, (1978), No. 10, pp. 1869, 1870.

Clarke et al., "The Preparation of High Purity Epitaxial InP," Solid State Communications, vol. 8, pp. 1125–1128, (1970), Fergamon Press.

Primary Examiner—John Doll
Assistant Examiner—Wayne A. Langel
Attorney, Agent, or Firm—Donald J. Singer; William J. O'Brien

[57] ABSTRACT

A method for producing highly pure indium for subsequent utilization as a reaction component in the synthesis of polycrystalline, indium phosphide which includes the step of heating raw indium under vacuum in an open ended quartz ampoule to a temperature in excess of 850° C. followed by the step of sealing the ampoule while simultaneously maintaining said vacuum within the interior of the ampoule.

3 Claims, 2 Drawing Figures

METHOD FOR VACUUM BAKING INDIUM IN-SITU

STATEMENT OF GOVERNMENT INTEREST

The invention described herein may be manufactured and used by or for the Government for governmental purposes without the payment of any royalty thereon.

BACKGROUND OF THE INVENTION

This invention relates in general to the synthesis of highly pure, polycrystalline, indium phosphide. In a more particular aspect, this invention concerns itself with a method for the in-situ baking of raw indium to produce indium of the highest quality prior to its use as one of the reaction components in the synthesis of polycrystalline indium phosphide.

High purity, single crystal, indium phosphide, a group III–V semiconductor compound, has become an important semiconductor material for a number of technical applications. It is considered to be a critical material for use as a substrate for lattice-matched fiber-optic sources and detectors, high speed integrated circuits, and high frequency microwave devices. Its large band gap (1.35 eV) and high electron mobility make it useful as a semiconductor material, especially when employed in its highly pure form and as a crystalline substrate for device fabrication by epitaxial deposition techniques. However, it is extremely difficult to grow single crystals of indium phosphide having the degree of purity necessary for its successful utilization as a thin film device.

A number of methods have been suggested for synthesizing polycrystalline indium phosphide. One method for synthesizing fairly large ingots involves the direct reaction of elemental phosphorus with elemental indium. This method offers the advantgage of producing a relatively pure product since there is no possibility of contamination by other reactants. Unfortunately, the reaction often leads to large pressure buildup with a resulting explosive potential. This method requires small, strongly sealed containers or bombs and is an expensive and dangerous method for conducting the reaction. Also, the indium and phosphorus reaction components, in their raw form, do not possess a basic purity requisite to the ultimate synthesis of a highly pure indium phosphide polycrystalline ingots. Reaction methods involving compounds of indium and phosphorus, rather than elemental reactants, have also been suggested, but the resulting indium phosphide has often been lacking in the degree of purity needed to grow good single crystals.

A method which has proven successful in growing single crystal InP is the Liquid Encapsulated Czochralski (LEC) technique from polycrystalline InP. The polycrystalline ingots of indium phosphide are generally synthesized from solution in a modified Bridgman apparatus. Unfortunately, however, the polycrystalline indium phosphide feed material does not possess the very high degree of purity needed for producing InP single crystals having the necessary electrical properties which lead to the efficient utilization of InP semiconductor materials.

In an attempt to overcome this problem, it was found that the in-situ vacuum baking of a raw indium reaction component immediately prior to synthesizing a polycrystalline material ingot would lead to the growth of single crystal materials with the highest purity and lowest residual carrier concentration.

SUMMARY OF THE INVENTION

The present invention concerns itself with a method for synthesizing highly pure, polycrystalline, indium phosphide materials for semiconductor applications. The method includes the in-situ vacuum baking of raw indium prior to using the indium as a reaction component, in combination with phosphorus, in the conventional synthesis of polycrystalline indium phosphide. In the method of this invention, raw indium is placed in a quartz boat which in turn is positioned in one end of a quartz tube or ampoule. Red phosphorus is positioned in the other end of the ampoule. The loaded ampoule is then placed in a special see-through furnace under vacuum. Power is supplied to the furnace adjacent to the position of the indium in order to raise the temperature of the indium to its baking temperature. The furnace temperature profile determines the length of the ampoule, indium boat position and melt zone. The portion of the ampoule containing the red phosphorus extends beyond the furnace heat zone and is cooled to prevent vaporization. The furnace temperature is raised to the desired baking temperature in one-half hour. For the first one to two hours of baking the ampoule is evacuated to $1 \times 10^{-4}$ Torr using sorption pumps. After pumping for one to two hours, a vac ion pump is opened to the ampoule. Baking continues for a total of 6 hours at which point a vacuum of $5 \times 10^{-6}$ Torr is achieved. After this length of time, the power to the furnace is turned off and the ampoule is left to cool while still connected to the vac ion pump. While still under vacuum, the ampoule is sealed ($1 \times 10^{-7}$) by heating the ampoule wall around an internal sealing plug until the wall collapses on the plug thereby sealing the ampoule and its contents.

Previous sealing methods required transferring the baked indium from one vessel to another. The in-situ method of this invention, however, allows the red phosphorus to be placed in the extreme right end of the ampoule and the indium in a quartz boat in the left end of the ampoule. The special quartz plug is filled inside the loaded quartz ampoule which in turn is connected to a vacuum system. This method completely eliminates any contamination from the flame or the atmosphere surrounding the ampoule.

Accordingly the primary object of this invention is to provide a method for producing indium phosphide, single crystals of high purity.

Another object of this invention is to provide a method for producing highly pure, polycrystalline, indium phosphide which includes the in-situ vacuum baking of raw indium prior to its utilization in the synthesis of the indium phosphide, polycrystalline ingots.

The above and still other objects and advantages of the present invention will become more readily apparent upon consideration of the following detailed description thereof when taken in conjuntion with the accompanying drawings.

In the Drawing:

FIG. 1 represents a schematic illustration, partly in section, showing an apparatus suitable for use with the method of this invention; and FIG. 2 represents a graphical illustration showing mobility versus ingot length for polycrystalline, indium phosphide prepared in accordance with the invention.

DETAILED DESCRIPTION OF THE PREFERRED EMBODIMENT

Pursuant to the above-defined objects, the present invention concerns itself with the in-situ vacuum baking of raw indium and its subsequent utilization as a highly pure reaction component in the synthesis of polycrystalline, indium phosphide for the subsequent growth of single crystal InP in accordance with conventional LEC crystal growing techniques. The single crystal material is characterized by high purity and excellent electrical characteristics.

Figure 1:
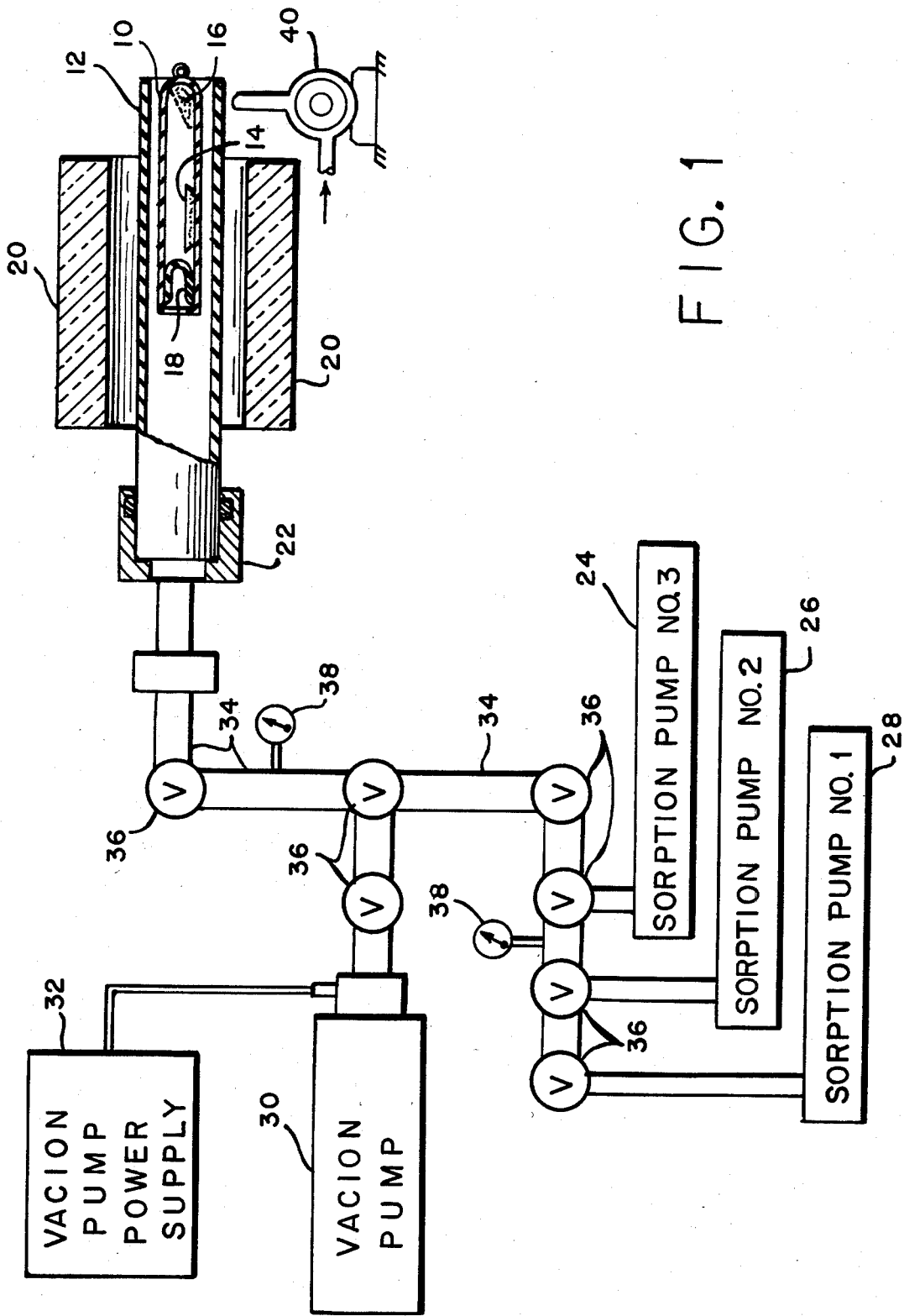

In order to illustrate the method of this invention with specificity, reference is now made to FIG. 1 in the drawing. FIG. 1 discloses an apparatus comprising a typically loaded quartz ampoule 10 positioned within a quartz support tube 12. Raw indium is placed in a quartz boat 14 positioned in one end of ampoule 10. Red phosphorus 16 is placed in the other end of ampoule 10. A quartz plug 18 is placed in the end of the ampcule adjacent the position of the quartz boat 14.

The loaded ampoule 10 and quartz support tube 12 are placed within a Trans Temp see-through furnace 20 (Trans Temp Company, 155 Sixth Street, Chelsea, Mass. 02150, USA) which extends along the length of the tube 12. A stainless steel O-ring adapter 22 is used to couple the tube 12 and ampoule 10 to a vacuum system manifold which can be connected to either sorption pumps 24, 26 and 28 or vac ion pumps 30 and 32 through flexible tubing 34, valves 36 and pressure guages 38. Power is applied to the Trans Temp furnace 20 after a vacuum of about $1 \times 10^{-4}$ Torr is obtained. Only that portion of the ampoule 10 that contains the loaded boat 14 is in the furnace 20. The right end of the ampoule that contains the red phosphorus extends beyond the furnace heat zone and is cooled by means of blower 40 to prevent vaporization of the red phosphorus. The furnace temperature is raised to the desired baking temperature in one-half hour. For the first one to two hours of baking, the ampoule 10 is evacuated to $1 \times 10^{-4}$ Torr using the cryogenic sorption pumps 24, 26 and 28. After pumping for one to two hours, the vac ion pump 30, powered by power supply 32 is opened to the ampoule 10. Baking continues for a total of about 6 hours at which point a vacuum of $5 \times 10^{-6}$ Torr is achieved. After this length of time, the power to the furnace is turned off the ampoule is allowed to cool while still connected to the vac ion pump. While still under vacuum, the ampoule is sealed ($1 \times 10^{-7}$ Torr) by heating the ampoule wall around the internal sealing plug 18 until the wall collapses on the plug 18. This completely eliminates any contamination from the flame or surrounding ambient atmosphere.

This procedure produces highly pure, contamination free, indium which is positioned within the sealed ampoule 10. Synthesis of polycrystalline indium phosphide is then accomplished by heating the indium containing boat 14 and the red phosphorus 16. Heat during synthesis is accomplished by using two single zone Lindberg furnaces, not shown, which use Dynatherm isothermal liners (Dynatherm Corporation, Marbe Court off Industry Lane, Cockeysville, Md. 21030, USA). This synthesis system gives two long flat heat zones of 1015° and 465° C. respectively with a sharp temperature slope between the zones. The phosphorus furnace is turned on after the indium temperature reaches 1015° C. When the phosphorus temperature reaches 465° C., the furnaces are allowed to equilibrate overnight before furnance travel is initiated. The travel rate is one-half inch per day. All polycrystalline ingots were six inches long and weighed approximately 400 g. Total synthesis time was 14 days.

Slices 20 mils thick were cut from the polycrystalline ingot. 77K Van der Pauw measurements of the carrier concentration and mobility, made on 100–150 mil square samples cut from large single crystal grains were obtained from these slices, were used as an indication of the purity of the synthesized polycrystalline ingots. A tabulation of the baking conditions used and the electrical properties of the best sample from each ingot is given in Table I.

TABLE I
Baking conditions versus 77K electrical data

| Temperature (°C.) | Time (h) | h (carriers/cm$^3$) | (cm$^2$/V · S) |
|---|---|---|---|
| ▲ 800 | 6 | $1.3 \times 10^{-15}$ | 64,000$^a$ |
| ○ 848 | 4 | $8.5 \times 10^{-14}$ | 85,500 |
| ■ 850 | 6 | $2.0 \times 10^{-14}$ | 134,000 |
| ◊ 900 | 6 | $3.0 \times 10^{-14}$ | 138,500 |
| ● 950 | 6 | $5.6 \times 10^{-14}$ | 110,000 |
| □ Not baked | | $2.0 \times 10^{-15}$ | 47,000 |

$^a$ Data for.

Figure 2:
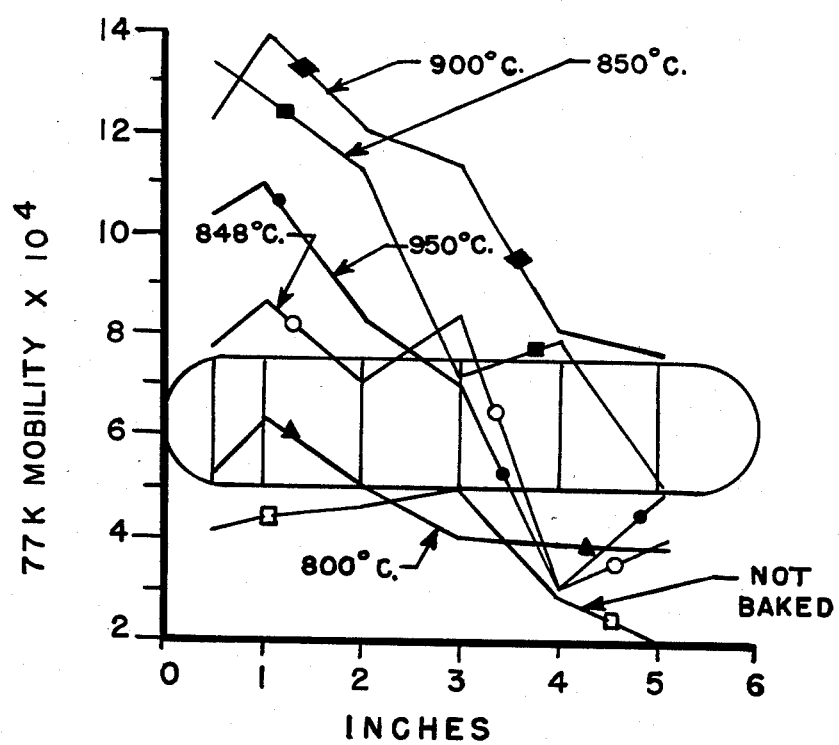

FIG. 2 is a plot of the 77K mobility versus the distance along the ingot from the first-to-freeze end and also shows a top view of the ingot. The vertical lines on the ingot show the position from which the slices (which yielded the Van der Pauw samples) were cut. Each line in FIG. 2 corresponds to one of the baking conditions shown in Table I as indicated by the symbols in the first column thereof.

The results clearly indicate that in-situ vacuum baking of the indium prior to synthesis of the polycrystalline material at temperatures of 850° C. and above, significantly improves the electrical properties of the resulting polycrystalline InP. Mass spectrometric analysis on these samples is inconclusive due to the low concentrations of the impurities involved. The carrier concentration and mobility measurements reported are, however, within the limits of published InP electrical and compensation ratio data. The resulting polycrystalline indium phosphide with its excellent eleddrical properties can be used as a feed material to grow high purity single crystals of indium phosphide in accordance with conventional liquid encapsulated Czochralski crystal growing technique From a consideration of the aforementioned, it can be seen that the present invention provides a novel method for purifying indium prior to its use in the synthesis of polycrystalline, indium phosphide. Previous sealing methods required the transfer of the baked indium from one vessel to another. The in-situ baking of this invention, however, allows the red phosphorus to be placed in the extreme right end of the ampoule with the indium reactant being placed in the left end of the ampoule. The use of a quartz plug to fit inside the loaded ampoule and coupling it to a vacuum source permits the ampoule and its contents to be sealed under vacuum by collapsing the wall of the ampoule, at the left end, around the glass plug without exposing the purified indium to the outside atmosphere and possible contamination.

While the inventon has been described with particularity in reference to a specific embodiment thereof, it is to be understood that the disclosure of the present invention is for the purpose of illustration only and is not intended to limit the inventon in any way, the scope of which is defined by the appended claims.

What is claimed is:

1. A process for producing highly pure indium for subsequent utilization as a reaction component in the synthesis of highly pure, polycrystalline, indium phosphide which comprises the steps of:
   A. placing an indium loaded quartz container within one end of an open, elongated quartz ampoule;
   B. placing red phosphorus in the other end of said ampoule;
   C. heating said indium loaded quartz container under vacuum to a temperature and for a period of time sufficient to purify said indium while simultaneously cooling under vacuum said red phosphorus to a temperature below its vaporization point;
   D. sealing said quartz ampoule while simultaneously maintaining a vacuum atmosphere within said ampoule; and
   E. cooling said sealed ampoule to room temperature.

2. A process in accordance with claim 1 wherein said indium containing quartz container is heated to a temperature in excess of 850° C. for a period of about six hours.

3. A process in accordance with claim 1 and further including the step of individually heating said cooled indium and said cooled red phosphorus to predetermined temperatures and for periods of time sufficient to effect a reaction therebetween resulting in the synthesis of highly pure, polycrystalline, indium phosphide.

* * * * *